May 19, 1964   E. M. KLAKOVICH   3,133,768
EXTENSIBLE CHASSIS SLIDE
Filed Jan. 11, 1960   3 Sheets-Sheet 1
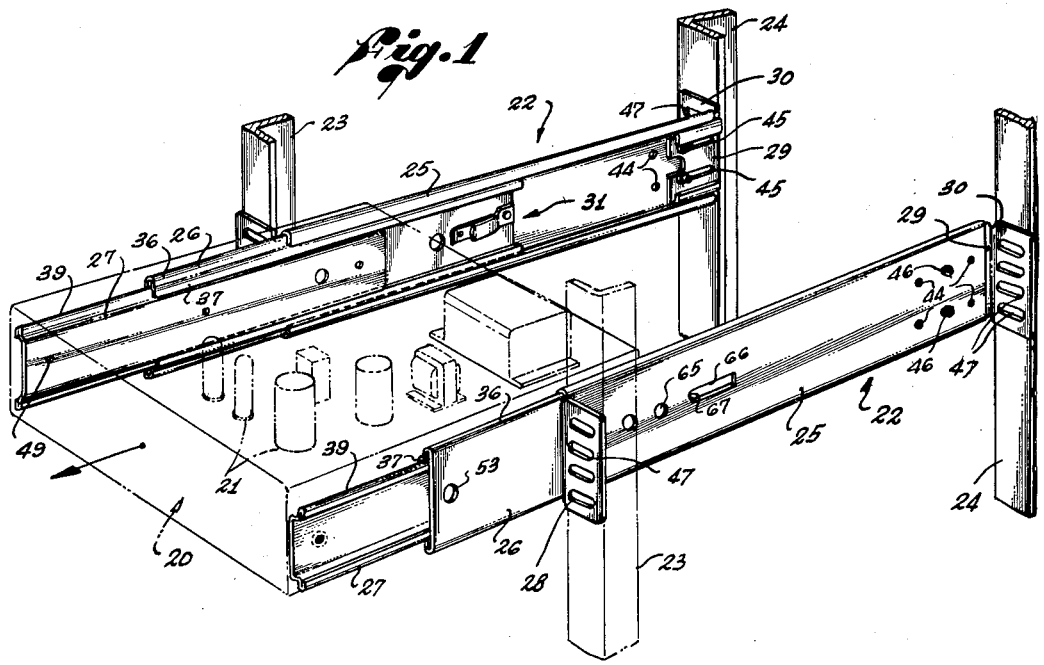
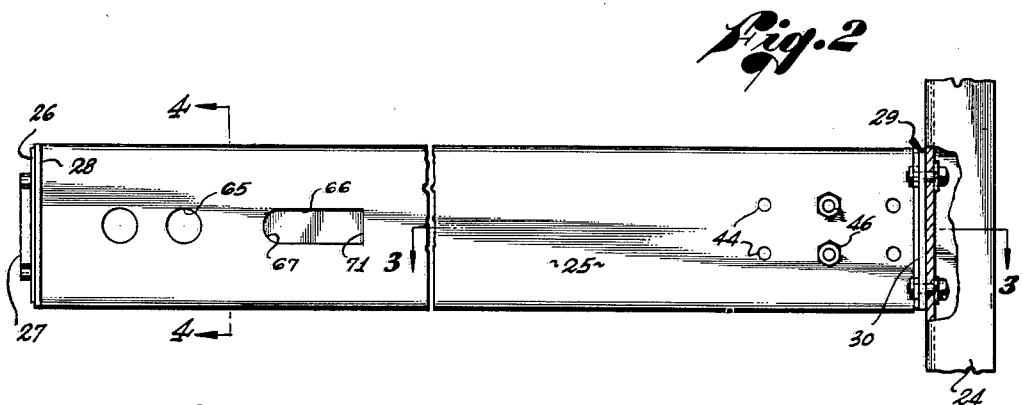
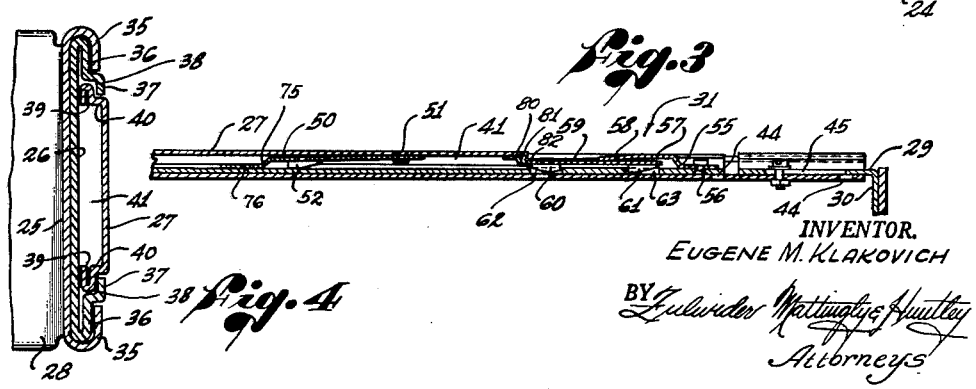
INVENTOR.
EUGENE M. KLAKOVICH May 19, 1964    E. M. KLAKOVICH    3,133,768
EXTENSIBLE CHASSIS SLIDE
Filed Jan. 11, 1960    3 Sheets-Sheet 2
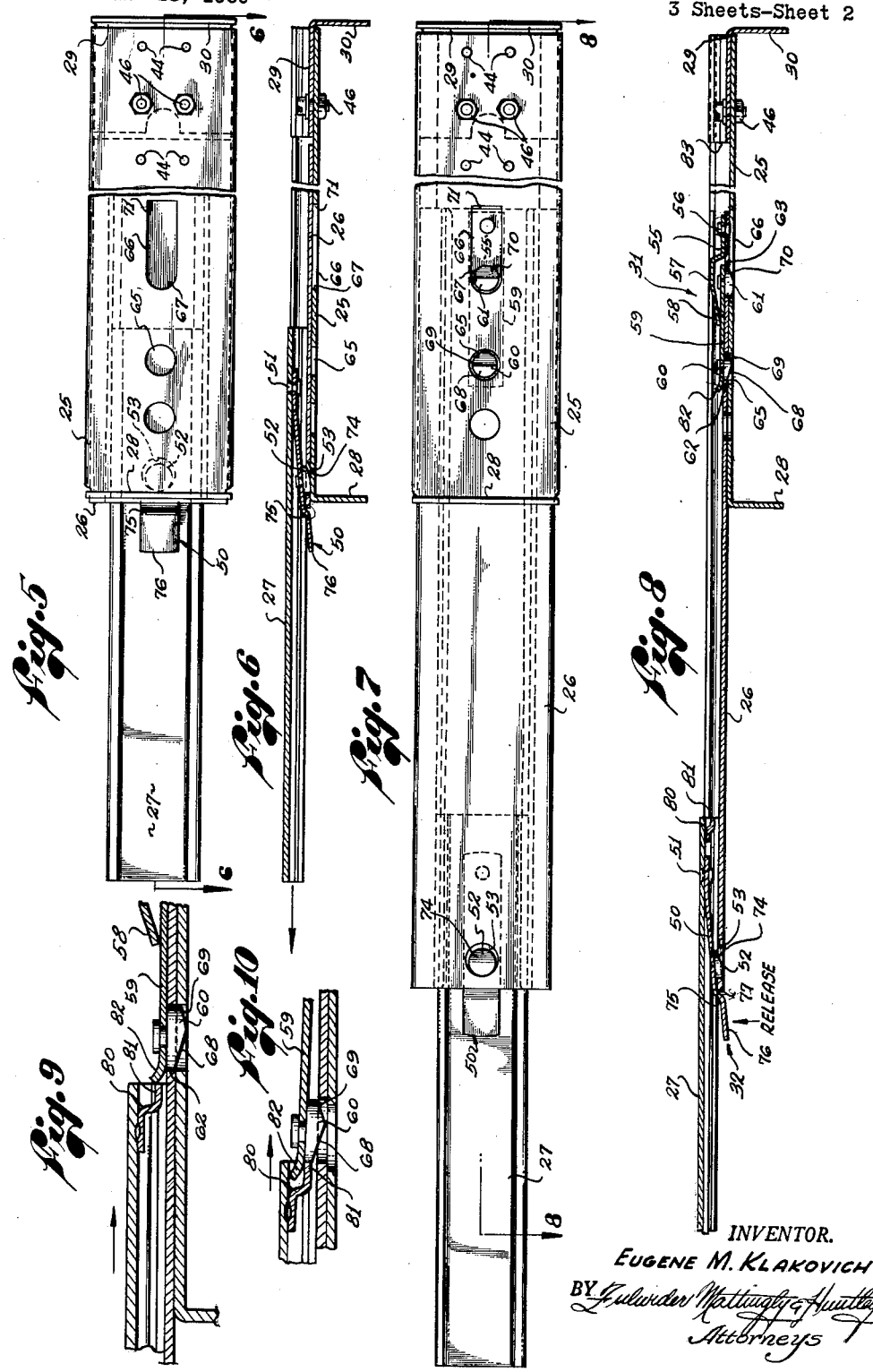
INVENTOR.
EUGENE M. KLAKOVICH
BY
Attorneys May 19, 1964   E. M. KLAKOVICH   3,133,768
EXTENSIBLE CHASSIS SLIDE
Filed Jan. 11, 1960   3 Sheets-Sheet 3
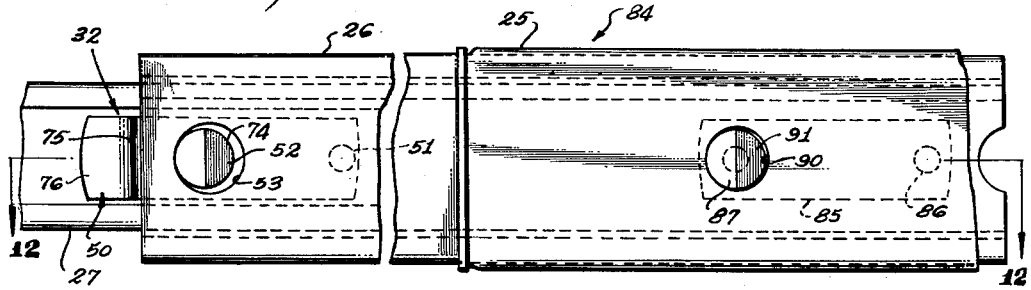
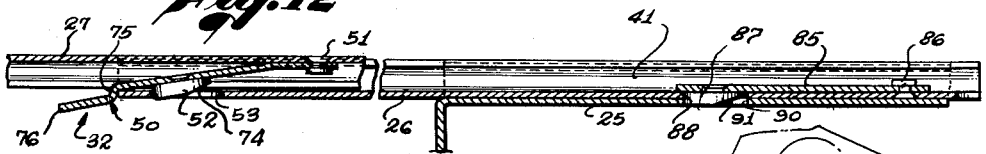
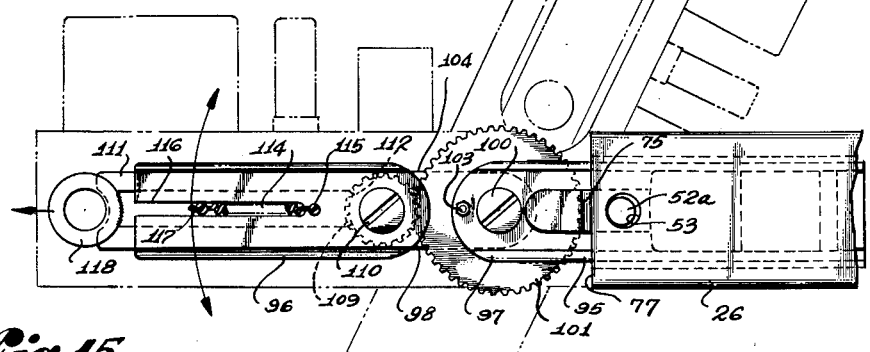
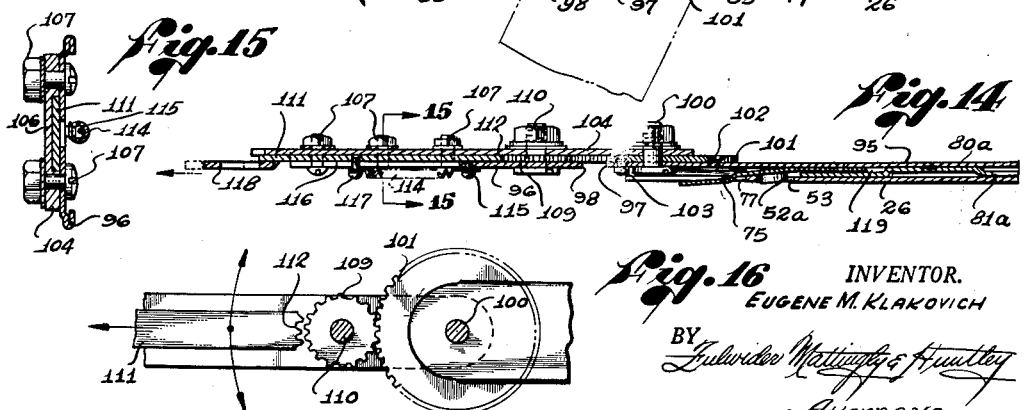
INVENTOR.
EUGENE M. KLAKOVICH
BY
Attorneys United States Patent Office 3,133,768
Patented May 19, 1964

3,133,768
EXTENSIBLE CHASSIS SLIDE
Eugene M. Klakovich, Encino, Calif., assignor to Markline Electronic Products Inc., North Hollywood, Calif., a corporation of California
Filed Jan. 11, 1960, Ser. No. 1,752
4 Claims. (Cl. 308—3.6)

The present invention relates generally to extensible slide assemblies for cabinets and more particularly to slide assemblies for supporting a chassis of electronic components for movement into and out of a cabinet.

It is common practice to support a plurality of electronic chassis within a common cabinet. This is accomplished by mounting each chassis on a cantilever track or slide assembly whereby the chassis may be pulled out and pushed into the cabinet at will. An object of my invention is to provide an improved slide assembly for the supporting of such chassis within their cabinet.

An important object of my invention is to provide a compact miniaturized slide assembly which provides greater strength and rigidity in less space. This miniaturization also minimizes interference with ventilation of the electronic chassis supported by a pair of the slide assemblies.

Another object of the invention is to provide a slide mechanism comprising a telescopic assembly of one-piece slide sections having rounded bearing surfaces. This arrangement avoids scoring, warping and lateral play of the one-piece sections, even after a long period of use, and assures smooth, non-binding operation of the slides throughout their service life.

Yet another object of the invention is to provide improved latching means for releasably maintaining the slide assemblies in extended positions. The latching means prevent accidental displacement of any one of the one-piece sections relative to its supporting section and also permit complete removal of a chassis from its supporting slide assemblies without removing any bolts or other fasteners.

The invention also has for an object the provision of latching means for the slide sections entirely contained within the thickness and height dimensions of the telescopically related sections. This arrangement also minimizes the space occupied by the slide assemblies and, furthermore, permits flush mounting of the sidewalls of a chassis against a section of the slide assembly, further minimizing the space occupied by the entire chassis and its supporting hardware.

Yet another object of the invention is to provide chassis-supporting slide assemblies of this character to permit selective movement of the supported chassis about a horizontal axis to expose the components on the under side of the chassis.

These and other objects and advantages of my invention will be apparent from the following description, when taken in conjunction with the annexed drawings in which:

FIGURE 1 is a perspective view of a pair of chassis slide assemblies embodying the invention, the several sections of each being partly separated from one another to better expose details of construction of each section;

FIGURE 2 is a side elevational view of one of the slide assemblies shown in FIGURE 1, the several sections being illustrated in telescopically collapsed condition;

FIGURE 3 is a partial sectional view taken on the longitudinal line 3—3 of FIGURE 2;

FIGURE 4 is a vertical sectional view taken on the line 4—4 of FIGURE 2;

FIGURE 5 is a view similar to FIGURE 2 but showing the first step in the extension of the slide assembly;

FIGURE 6 is a sectional view on the line 6—6 of FIGURE 5;

FIGURE 7 is a view similar to FIGURE 5 but illustrating the relationship of the several sections in the fully extended position of the slide assembly;

FIGURE 8 is a sectional view taken on the line 8—8 of FIGURE 7;

FIGURE 9 is a sectional view, on a larger scale, illustrating the release means for allowing inward movement of the intermediate section relative to the fixed section of the slide assembly;

FIGURE 10 is a view similar to FIGURE 9 illustrating releasing movement of the latch means;

FIGURE 11 is a view similar to FIGURE 5 but illustrating another embodiment of the invention;

FIGURE 12 is a sectional view taken on the line 12—12 of FIGURE 11;

FIGURE 13 is a partial elevational view of another embodiment of the invention and showing in phantom outline an electronic chassis in different angular positions relative to a supporting slide assembly;

FIGURE 14 is a sectional view taken on the longitudinal center line of FIGURE 13;

FIGURE 15 is a vertical sectional view taken on the line 15—15 of FIGURE 14; and FIGURE 16 is a partial elevational view similar to FIGURE 13 and showing a portion of the latching means in a released position to permit angular adjustment of the chassis supported thereby.

Referring to FIGURE 1, a chassis 20 and electronic components 21 are shown in phantom outline, the chassis being supported on a pair of slide assemblies 22. It will be understood that a plurality of chassis are supported in vertical columns in a common cabinet (not shown) that includes a vertically extending pair of front rails 23 and a vertically extending pair of rear rails 24.

In general, each assembly 22 comprises a fixed section 25, an intermediate section 26, and a chassis-supporting or small section 27. The fixed section 25, at its forward end, is provided with a right angle flange 28 for abutment against one of the front rails 23. An adjustable bracket 29 is mounted on the rear end of the fixed section 25 and has a flange 30 for abutment against a face of one of the rear rails 24. A latch means, designated generally by the numeral 31, is provided for releasably interconnecting the fixed section 25 and intermediate section 26. For releasably interlocking the intermediate section 26 and the small section 27 another latch means 32 is provided, which is best seen in FIGURE 8. Each of the assemblies 22 is symmetrical about its longitudinally extending centerline so that any assembly 22 can be utilized for connection to either the left or the right hand side of a chassis 20.

More specifically, the fixed section 25 has its opposite longitudinally extending edges formed with a 180 degree bend to define rounded tracks 35. The intermediate section 26 has its opposite longitudinally extending edges folded back over the web of the section to form U-shaped flanges 36 with a depth complementary to the depth of the tracks 35. It will be observed that the bend radius of the flanges 36 defines rounded edges for the intermediate section 26 which are complementarily slidably receivable within the internal rounded bearing surfaces of the tracks 35. The span between the confronting portions of the web of the fixed section 25 and the track 35 embraces the flange 36 in a sliding fit.

To telescopically slidably support the small section 27, the intermediate section 26 has its flanges 36 terminating in lips 37, outwardly offset from and parallel to the flanges 36. The span between each lip 37 and the web portion of the intermediate section 26 thus provides a track 38 to support the opposite finished edges of the small section 27.

These finished edges comprise U-shaped flanges 39 formed along the opposite longitudinally extending edges of the small section 27 as extremities of a pair of opposed wall sections 40 that are disposed normally to the web of the small section 27.

As will be noted from FIGURE 4, the fixed section 25 and intermediate section 26 are slidably interrelated with their webs adjacent one another. The small section 27, however, is oppositely arranged so as to have its web portion spaced apart from the web of the intermediate section 26. An enclosed space 41 is thus defined between the webs of the intermediate section 26 and small section 27 and it is in this space that the latching means are normally confined.

An assembly 22 can be placed within cabinets of varying depths. This is accomplished by means of the adjustable bracket 29. This bracket has a body portion of the same cross-sectional configuration as the intermediate section 26. Accordingly, the bracket body has rounded edges which are slidably insertable within the tracks 35 of the fixed section 25 so as to be longitudinally adjustable relative to the fixed section. The fixed section 25 has a plurality of pairs of holes 44 formed in its rear end, the pairs of holes being spaced longitudinally of the fixed section. The bracket 29 has a parallel pair of longitudinally extending slots 45 registerable with opposite ones of the pairs of holes 44. Fasteners 46 are passed through a selected pair of the holes 44 and through the bracket slots 45, after the bracket has been adjusted relative to the fixed section 25 to place the bracket flange 30 in abutment with a face of one of the rear rails 24. Although not shown, it will be understood that the flange 28 on the forward end of the fixed section 25 and the flange 30 on the bracket 29 are held in place on the rails 23 and 24, respectively, by suitable fasteners, which pass through one of a plurality of vertically spaced apart and horizontally elongated slots 47 formed in the flanges 28 and 30.

The chassis 20 is supported on the small sections 27 of a pair of the assemblies 22. For this purpose, each section 27 is provided with a plurality of holes 49, longitudinally spaced apart on the fixed section, and the opposite left and right sidewalls of the chassis 20 are provided with corresponding holes which are registerable with the holes 49. By virtue of the slots 47 in the flanges 28 and 30, the pair of assemblies 22 can be adjusted into accurate parallelism, with the space between the confronting faces of the pair of small sections 27 complementary to the width of the chassis 20. The chassis sidewalls thus can be mounted in flush engagement with the sections 27. Suitable fasteners (not shown) are then employed to secure the chassis in place.

When a pulling force is exerted on the chassis 20, the pair of small sections 27 first move forwardly and outwardly along the intermediate sections 26, which remain stationary during this initial pulling until latching engagement of the means 32. Subsequent pulling on the chassis 20 causes the pair of intermediate sections 26 to be pulled outwardly of the pair of fixed sections 25, concurrently with the continued outward movement of the sections 27. When the latch means 31 snaps into engagement, further outward movement of the sections 27 and section 26 is arrested and the chassis 20 is supported in an exposed position outside of its cabinet.

More specifically, the latch means 32 comprises an irregularly shaped spring arm 50 arranged along the longitudinal centerline of the small section 27. At its rear end this spring arm is secured to the inner face of the web of the small section 27, adjacent the rear end of the small section, by a rivet 51. This rivet is countersunk to be flush with the outer face of the web of the small section 27, and so does not extend into the space occupied by one sidewall of the chassis 20. As is shown in FIGURE 3, when the several sections of the assembly 22 are collapsed, the spring arm 50 is disposed within the space 41 and is slidable therethrough when the chassis 20 is moved.

Near its free end, the spring arm 50 carries a button 52 that is unidirectionally drivingly engageable within the front edge of a hole 53 in the front end of the intermediate section 26. Thus, as is indicated in FIGURES 5 and 6, when the small section 27 is pulled outwardly along the intermediate section 26, the button 52 is biased into engagement with the hole 53 by the spring arm 50, when the two move into registration. On its forward edge the button 52 has a right cylindrical configuration and an axial length approximately equivalent to the wall thickness of the web of the intermediate section 26. This forward edge of the button 52 thus provides an abutment whereby continued pulling on the small section 27 causes concurrent outward movement of the intermediate section 26.

The latch means 31 is also arranged along the longitudinal centerline of the assembly. This latch means has a spring arm 55 whose rear end is affixed adjacent the rear end of the intermediate section 26 by a countersunk rivet 56. The spring arm 55 is within the channel of the intermediate section 26 and at its free end 57 is offset from the web of the intermediate section. The extreme end 58 of the arm 55 being bent slightly back towards the web of the intermediate section. This extreme end engages the midpoint of a longitudinally extending plate 59 and a pair of buttons 60 and 61 are affixed to opposite ends of the plate. A pair of holes are formed in the web of the intermediate section 26 to provide pockets 62 and 63 within which the buttons 60 and 61, respectively, are held by the biasing action of the spring arm 55.

The buttons 60 and 61 have an overall axial length greater than the wall thickness of the intermediate section 26 whereby the plate 59 is held spaced apart from the web of the intermediate section. This plate is arched concavely relative to the confronting face of the intermediate section's web but is normally held in the substantially straight condition illustrated by the force of the spring 55. Referring to FIGURE 3, it will be noted that the entire assembly of the latch means 31 is confined within the thickness of the assembly 22.

Referring particularly to FIGURES 7 and 8, the fixed section 25 adjacent its forward end is formed with a hole 65 in front of an elongated aperture 66. At its forward end, the aperture 66 has a semi-circular edge 67 whose center is spaced from the center of the hole 65 a distance equivalent to the spacing between centers of the buttons 60 and 61. Thus, when the intermediate section 26 is pulled forwardly along the fixed section 25, the buttons 60 and 61 are consecutively snapped into the aperture 66. Continued forward movement brings the forwardmost edge of the button 61 into contact with the semi-circular edge 67 of the aperture 66, at which time the button 60 is in registration with the hole 65. The button 60 is then snapped into engagement by the force of the spring arm 55.

It will be noted that the button 60 on its forwardmost face has an axial length less than the wall thickness of the web of the intermediate section 26. Therefore, when the intermediate section is being pulled outwardly on the fixed section 25, the button 60, by virtue of a forwardly facing cam surface 68, is enabled to override the semi-circular edge 67 of the aperture 66. On its rearmost portion, the button 60 has a beveled or cam face 69 which in its shortest axial length, however, is longer than the wall thickness of the intermediate section 26. Accordingly, once the latch means 31 has snapped into the engaged position of FIGURE 8, the button 60 prevents inward movement of the intermediate section 26 until the latch means 31 is actuated to positively disengage the button 60 from the hole 69.

The button 61 in its forwardmost portion has an axial length exceeding the wall thickness of the intermediate section 26. Accordingly, the button 61 engages the semi-circular edge 67 to prevent further outward movement of the intermediate section. However, on its rearmost portion the button 61 has a beveled or cam face 70 so that at its rearmost edge it has an axial length less than the wall thickness of the intermediate section. Therefore, once the button 60 has been released and the intermediate section 26 then moved rearwardly, the button 61 is cammed out of the aperture 66 by engagement with the rear edge 71 of the aperture.

Referring now to FIGURE 8, it will be observed that the button 52 in its rearmost portion is also provided with a cam face 74 so that it has an axial length in its rearmost edge preferably less than the wall thickness of the intermediate section 26. However, the chassis on the small section 27 is yieldably held against inadvertent inward movement of the chassis by the configuration of the free end of the latch spring 50. Forwardly from the button 52 the spring 50 has a joggle 75 that includes an obtuse angle with the spring 50. The joggle then develops into a flat, finger-engageable portion 76 that is offset from the body of the spring 50 a distance approximating the wall thickness of the intermediate section 26. The joggle 75 is thus positioned to confront the extreme forward edge 77 of the intermediate section 26 and, by virtue of its inclination, yieldably resists rearward displacement of the small section 27.

In order to completely remove the chassis 20 from its supporting assemblies 22, the finger engageable portion 76 of the spring 50 is depressed to lift the button 52 out of the hole 53. Thereafter, the chassis 20, with a pair of small sections 27 affixed thereto, can be moved completely out of supporting engagement with the intermediate sections 26.

To replace the chassis 20 in its cabinet, it is only necessary that a positive inward force be applied to the chassis. As a result of this inward force, the joggle 75 is caused to override the edge 77 of the intermediate section 26. The button 52 is thus concurrently pulled out of the hole 53, overriding the rear edge of the hole. The chassis 20 and small sections 27 can then be moved inwardly relative to the intermediate sections 26.

The web of the small section 27, on its inner face and at its extreme rear end, has a catch 80 secured thereto for releasing the latch means 31. This catch has a straight lip 81 extending transversely across the small section 27 in substantially a common plane with the extreme rear edge of the small section, but offset from the inner face of the web of the small section 27. The plate 59 of the latch means 31, at its forward end 82, is turned away from the web of the intermediate section 26. Upon engagement by the rearwardly moving lip 81, the end 82 is deflected away from the web of the intermediate section to enter into the space between the lip 81 and the web of the small section 27. This causes the button 60 to be partially pulled out of the hole 65 in the fixed section 25, so that the beveled face 69 of the button 60 can override the rear edge of the hole 65.

The lip 81 now being drivingly engaged with the plate 59, continued rearward movement of the small section 27 induces rearward movement of the intermediate section 26. This occurs without any substantial displacement of the plate 59 longitudinally of the intermediate section 26 because the end 82 of the plate is confined between the lip 81 and the web of the intermediate section 27. As a result, the button 60 is in driving engagement with the rear edge of its pocket 62. Continued rearward movement of the intermediate section 26 causes the button 61 to engage the rear edge 71 of the aperture 66 to be cammed out of the aperture. The telescoped sections 26 and 27 then move rearwardly until the rear end of the intermediate section engages the forward edge 83 of a bracket 29.

The embodiment of my invention just described is primarily adapted to support relatively heavy chassis and is depicted in the drawings on a reduced scale. In FIGURES 11 and 12, a slide assembly 84 is illustrated, primarily intended for supporting lighter weight chassis. This alternate embodiment of the invention is similar to the assembly 22 and will be described in detail only with reference to the specific points of difference.

The assembly 84 has the previously described latching means 32, for releasably interlocking the small section 27 and intermediate section 26. However, a simplified form of latch means is provided for releasably interlocking the intermediate section 26 and fixed section 25 and the three telescopic sections 25, 26 and 27 have a slightly different mode of operation. Both the simplified latch and latch means 32 are completely confined within the space 41.

The intermediate section 26, on the inside of its web and near the rear end thereof, has a flat spring arm 85 secured at its rear end to the intermediate section by a countersunk rivet 86. At its free end, the spring 85 mounts a button 87 in registration with a hole 88 formed in the web of the intermediate section 26. Although the sections 25, 26 and 27 are illustrated in FIGURES 11 and 12 as being in latched or engaged position, it will be understood that, when unlatched, the button 87 rides on the inner face of the web of the fixed section 25. The spring arm 85 and button 87 have a width less than the width of the space 41 defined by the webs of the small section 27 and intermediate section 26.

Near its front end, the fixed section 25 is formed with a hole 90 that is adapted to receive the button 87 when the intermediate section 26 is moved forwardly. In its forward portion, the button 87 has an axial length exceeding the width or wall thickness of the web of the intermediate section 26. The button 87 thus unidirectionally engages the forward edge of the hole 90 whereby to prevent further outward movement or forward movement of the intermediate section 26.

In its rear portion, the button 87 is formed with a cam face 91 that tapers rearwardly until at the rear edge of the button its axial length is less than the wall thickness of the web of the intermediate section 26. The button 87 is thus self-releasing from latching engagement with the fixed section 25, but only upon rearward movement of the intermediate section 26.

This self-releasing feature of the button 87 avoids the need for the release hook 80 previously described in connection with the first embodiment of the invention. Thus, in the assembly 84, the outward or forward movement of a chassis 20 is positively limited by the latch means 32 and the button 87. The latch means 32 yieldably opposes inward movement of the small section 27. Inward movement of the intermediate section 26 is yieldably opposed by the force of the spring arm 85 and cam face 91 of the button 87.

Upon closing movement of the sections 26 and 27, the latch means 32 and button 87 simultaneously yieldably resist such closing movement. When sufficient force is applied to the chassis 20, these two latches tend to release simultaneously and the sections 26 and 27 also tend to move concurrently rearwardly onto the fixed section 25. Although not shown, this embodiment of the invention includes the previously described bracket 29 whose forward edge 83 limits inward movement of the intermediate section 26, after which the small section 27 can be moved farther inwardly, if necessary, until the cover of the chassis 20 is co-planar with the front of the cabinet.

FIGURES 13 through 16 illustrate an alternative form of removable small section of an assembly for supporting a chassis 20 so that it can be angularly adjusted. In this embodiment, the small section assembly comprises two pieces 95 and 96 having a cross-sectional configuration identical to the small piece 27 previously described. However, the adjacent ends of the pieces 95 and 96 are semi-circular in configuration, as shown at 97 and 98 respectively, whereby to provide a proper clearance for angular movement of the piece 96 relative to the piece 95.

At its forward end the piece 95 mounts a stud 100, which defines a horizontal pivot axis for the chassis 20.

A sun gear 101 is coaxially mounted on this stud and is held against rotation relative to the piece 95 by a pair of fasteners 102 and 103, which pass through the sun gear and the web of the piece 95. The sun gear 101 is mounted against the outer face of the web of the piece 95 and one end of a link bar 104 is journaled on the stud 100, on top of the sun gear.

The forward end of the link bar 104 is of greater thickness than the rear end that is attached to the stub 100 and, on its face abutting the outer face of the web of the piece 96, is provided with a longitudinally extending channel 106. A plurality of pairs of suitable fasteners 107 interconnect the link bar 104 and the piece 96, the fasteners passing through the link bar 104 in the longitudinal edge portions thereof.

At its rear end, the piece 96 journals a planetary gear or pinion 109 on a stud 110. This pinion is meshed with the sun gear 101 but is normally held against planetary movement therearound by an elongate latch 111 that is longitudinally slidably supported within the channel 106 and again the piece 96. At its rear end, the latch 111 is formed with teeth 112 that are engageable with the teeth of the pinion 109.

To normally bias the latch 111 into locking engagement with the pinion 109, I have provided the spring means best seen in FIGURE 13. This means includes a tension spring 114 secured at its rear end to a pin 115, fastened to the inner face of the web of the piece 96. The piece 96 is formed within an open end slot 116 to pass another pin 117, fastened to the latch bar 11 and connected to the forward end of the spring 114. At its forward end, the latch 111 is provided with a handle 118 through which a finger may be passed to pull against the force of the spring 114. The pinion 109 is thereby released to angularly adjust the chassis 20 around the axis of the stud 100.

The chassis 20, or the components thereon, might be easily damaged if it were accidently moved inwardly while in an angular position. Accordingly, it is preferable to provide a positive type of latch means for positively preventing such an accidental inward movement. This is accomplished by providing the latch means 32, which is affixed to the piece 95, with a button 52a that is of right cylindrical configuration and has an axial length appreciably greater than the wall thickness of the intermediate section 26. Thus, if an inward force is inadvertently applied to the chassis 20 while in an inclined position, the rearmost portion of the button 52a abuts the rear edge of the hole 53 to prevent inward movement of the chassis. It will be noted that the joggle 75 is spaced forwardly from the edge 77 of section 26 and so cannot cam the button 52a out of latched position. Thus, the portion 76 must be manually depressed before the chassis can be moved in or out from the fully extended position.

FIGURE 14 also shows an alternate form of catch designated as 80a. This is an elongated version of the catch 80 previously described, but in this instance is mounted on the inner face of the web of the piece 95 and has its lip 81a spaced more forwardly than the rear edge of the piece 95. The catch 80a also has a free end 119 that is offset from the web of the piece 95 and a portion of the latch spring 50 is disposed between the free end 119 and the web of the piece 95.

While several embodiments of my invention have been illustrated and described herein, it will be apparent to those skilled in the art that various modifications thereof may be made. Accordingly, I do not wish to be limited to the particular details of construction hereinbefore set forth but only by the spirit and scope of the following claims.

I claim:
1. In a slide assembly for supporting a chassis in a cabinet, the combination comprising: an elongated generally channel-shaped fixed section having opposite longitudinally extending edges reversely bent towards one another to define a pair of tracks; an elongated intermediate section having opposite longitudinally extending edges of a configuration matingly complementary to said tracks to be slidably supported on said fixed section, said intermediate section having a web superimposed on a web of said fixed section, the edges of said intermediate section having terminal portions extending towards one another to define a pair of tracks on said intermediate section; an elongated generally channel-shaped small section having opposite longitudinally extending edges that are slidable in and matingly complementary to said tracks of said intermediate section and having a web offset from the web of said intermediate section to define a clearance space between said webs; a latch spring mounted on the inner face of the web of said small section in said clearance space and whose free end extends forwardly of said intermediate section; a button on the free end of said latch spring and biased thereby against the inner face of the web of said intermediate section and into a hole formed in the web of said intermediate section when moved into registration with said hole whereby to interlock said small section and intermediate section, said button having unidirectional driving engagement with said hole to cause co-movement of said small section and intermediate section only when said small section is moved forwardly, said button having a cam engagement with a rear portion of said hole to be lifted out of said hole when said small section is moved inwardly of said intermediate section; and an integral extension of said latch spring that protrudes forwardly of the forward end of said intermediate section when said intermediate section and small section are interlocked and having a finger-engageable portion for depressing said spring to lift said button out of unidirectional driving engagement with said hole to permit said small section to be withdrawn forwardly from said intermediate section, said extension having a joggle confronting the forward end of the web of said intermediate section that has a cam engagement with said forward end whereby said spring yieldably resists inward movement of said small section on said intermediate section.

2. In a slide assembly for supporting a chassis in a cabinet, the combination comprising: an elongated generally channel-shaped fixed section having opposite longitudinally extending edges bent to define a pair of tracks; an elongated intermediate section having opposite longitudinally extending edges slidably supported on said tracks on said fixed section, said intermediate section having a web superimposed on a web of said fixed section, the edges of said intermediate section having terminal portions extending towards one another to define a pair of tracks on said intermediate section; an elongated generally channel-shaped small section having opposite longitudinally extending edges that are slidable in said tracks of said intermediate section and having a web offset from the web of said intermediate section to define a clearance space between said webs; a latch means mounted within said clearance space to releasably interlock said intermediate and small sections when said small section is extended forwardly from said intermediate section; a spring arm fastened to the inner face of the web of said intermediate section with a free end extending forwardly; a plate extending longitudinally of said intermediate section and biased towards the web of said intermediate section by said free end of said spring arm; a pair of buttons on the opposite ends of said plate positioned in pockets formed through the web of said intermediate section and having an over-all axial length exceeding the thickness of the web of said intermediate section, said pair of buttons being biased against the web of said fixed section and said fixed section having a pair of longitudinally spaced apart openings in its forward portion that are registrable with said pair of buttons when said intermediate section is moved forwardly on said fixed section, the forward one of said buttons having bi-directional camming engagement with the rear one of said openings to bi-directionally override the forward and rear edges of said rear opening and having unidirectional latching engagement with the forward one of said openings to prevent inward movement of said intermediate section, the rear one of said buttons having unidirectional camming engagement with said rear opening to override said rear opening when said intermediate section is moved inwardly and having unidirectional latching engagement with said rear opening to prevent forward movement of said intermediate section; and a member on the inner face of the web of said small section that is engageable with the forward end of said plate when said small section is moved inwardly on said intermediate section to cam the forward end of said plate away from the web of said intermediate section to pull the forward one of said buttons out of latching engagement with the forward one of said openings of said fixed section to permit inward movement of said intermediate section on said fixed section.

3. In a slide assembly for supporting a chassis in a cabinet, the combination comprising: an elongated generally channel-shaped fixed section having opposite longitudinally extending edges bent to define a pair of tracks; an elongated intermediate section having opposite longitudinally extending edges of a configuration matingly complementary to said tracks to be slidably supported on said fixed section, said intermediate section having a web superimposed on a web of said fixed section, the edges of said intermediate section having terminal portions extending towards one another to define a pair of tracks on said intermediate section; an elongated generally channel-shaped small section having opposite longitudinally extending edges that are slidable in said tracks of said intermediate section and having a web offset from the web of said intermediate section to define a clearance space between said webs; a latch spring mounted on the inner face of the web of said small section in said clearance space and whose free end extends forwardly of said intermediate section; a button on the free end of said latch spring and biased thereby against the inner face of the web of said intermediate section and into a hole formed in the web of said intermediate section when moved into registration with said hole whereby to interlock said small section and intermediate section, said button having unidirectional driving engagement with said hole to cause co-movement of said small section and intermediate section only when said small section is moved forwardly, said button having a cam engagement with a rear portion of said hole to be lifted out of said hole when said small section is moved inwardly of said intermediate section; a latch means mounted within said clearance space to releasably interlock said intermediate and small sections when said small section is extended forwardly from said intermediate section; a spring arm fastened to the inner face of the web of said intermediate section with a free end extending forwardly; a plate extending longitudinally of said intermediate section and biased towards the web of said intermediate section by said free end of said spring arm; a pair of buttons on the opposite ends of said plate positioned in pockets formed through the web of said intermediate section and having an over-all axial length exceeding the thickness of the web of said intermediate section, said pair of buttons being biased against the web of said fixed section and said fixed section having a pair of longitudinally spaced apart openings in its forward portion that are registrable with said pair of buttons when said intermediate section is moved forwardly on said fixed section, the forward one of said buttons having bi-directional camming engagement with the rear one of said openings to bi-directionally override the forward and rear edges of said rear opening and having unidirectional latching engagement with the forward one of said openings to prevent inward movement of said intermediate section, the rear one of said buttons having unidirectional camming engagement with said rear opening to override said rear opening when said intermediate section is moved inwardly and having unidirectional latching engagement with said rear opening to prevent forward movement of said intermediate section; and a member on the inner face of the web of said small section that is engageable with the forward end of said plate when said small section is moved upwardly on said intermediate section to cam the forward end of said plate away from the web of said intermediate section to pull the forward one of said buttons out of latching engagement with the forward one of said openings of said fixed section to permit inward movement of said intermediate section on said fixed section.

4. In a slide assembly for supporting a chassis in a cabinet, the combination comprising: an elongated generally channel-shaped fixed section having opposite longitudinally extending edges reversely bent through substantially 180 degrees towards one another to define a pair of substantially semi-cylindrical tracks; an elongated intermediate section having opposite longitudinally extending edges reversely folded towards one another and back over the web portion of said intermediate section to define substantially U-shaped edges having a radius slidably matingly complementary to said tracks, said intermediate section having a web portion superimposed on a web portion of said fixed section, said folded edges having terminal lips, parallel to said web portion and offset outwardly from said reversely folded edges to define a pair of tracks on said intermediate section; an elongated generally channel-shaped small section having opposite longitudinally extending edges whose extremities are folded into U-shaped flanges that are parallel to the web portion of said small section and slidably receivable in said tracks of said intermediate section, said edges of said small section having confronting wall portions intermediate said web portion and U-shaped flanges that slidably engage the lips of the tracks of said intermediate section whereby the web portion of said small section is spaced from the web portion of said intermediate section to define a clearance space between said web portions and between said confronting wall portions; a latch spring mounted on the inner face of the web of said small section in said clearance space and whose free end extends forwardly of said intermediate section; a button on the free end of said latch spring and biased thereby against the inner face of the web of said intermediate section and into a hole formed in the web of said intermediate section when moved into registration with said hole whereby to interlock said small section and intermediate section, said button having unidirectional driving engagement with said hole to cause co-movement of said small section and intermediate section only when said small section is moved forwardly, said button having a cam engagement with a rear portion of said hole to be lifted out of said hole when said small section is moved inwardly of said intermediate section; an integral extension of said latch spring that protrudes forwardly of the forward end of said intermediate section when said intermediate section and small section are interlocked and having a finger-engageable portion for depressing said spring to lift said button out of unidirectional driving engagement with said hole to permit said small section to be withdrawn forwardly from said intermediate section, said extension having a joggle confronting the forward end of the web of said intermediate section that has a cam engagement with said forward end whereby said spring yieldably resists inward movement of said small section on said intermediate section; a spring arm fastened to the inner face of the web of said intermediate section with a free end extending forwardly; a plate extending longitudinally of said intermediate section and biased towards the web of said intermediate section by said free end of said spring arm; a pair of buttons on the opposite ends of said plate positioned in pockets formed through the web of said intermediate section and having an over-all axial length exceeding the thickness of the web of said intermediate section, said pair of buttons being biased against the web of said fixed section and said fixed section having a pair of longitudinally spaced apart openings in its forward portion that are registrable with said pair of buttons when said intermediate section is moved forwardly on said fixed section, the forward one of said buttons having bi-directional camming engagement with the rear one of said openings to bi-directionally override the forward and rear edges of said rear opening and having unidirectional latching engagement with the forward one of said openings to prevent inward movement of said intermediate section, the rear one of said buttons having unidirectional camming engagement with said rear opening to override said rear opening when said intermediate section is moved inwardly and having unidirectional latching engagement with said rear opening to prevent forward movement of said intermediate section; and a member on the inner face of the web of said small section that is engageable with the forward end of said plate when said small section is moved inwardly on said intermediate section to cam the forward end of said plate away from the web of said intermediate section to pull the forward one of said buttons out of latching engagement with the forward one of said openings of said fixed section to permit inward movement of said intermediate section on said fixed section.

References Cited in the file of this patent

UNITED STATES PATENTS

| | | |
|---|---|---|
| 1,071,006 | Little | Aug. 19, 1913 |
| 2,277,702 | Kennedy | Mar. 28, 1942 |
| 2,566,064 | Keim | Aug. 28, 1951 |
| 2,655,422 | Gussack | Oct. 13, 1953 |
| 2,750,244 | Manson et al. | June 12, 1956 |
| 2,809,085 | Fall | Oct. 8, 1957 |
| 2,862,772 | Gussack | Dec. 2, 1958 |
| 2,987,364 | Fall | June 6, 1961 |